Feb. 14, 1928.

J. C. ZEDER 1,658,827

OIL FILTER

Filed March 25, 1926

Inventor
James C. Zeder

By *Hing Harness*

Attorney

Patented Feb. 14, 1928.

1,658,827

UNITED STATES PATENT OFFICE.

JAMES C. ZEDER, OF DETROIT, MICHIGAN, ASSIGNOR TO CHRYSLER CORPORATION, OF DETROIT, MICHIGAN, A CORPORATION OF DELAWARE.

OIL FILTER.

Application filed March 25, 1926. Serial No. 97,358.

It is the primary object of my invention to provide an oil filter of cheap and economical construction especially for use with an automobile engine.

A further object of my invention is to provide an oil filter that can be easily assembled or disassembled so that the filtering elements contained therein can be changed when desired without great expense or labor.

With the above and other objects in view, my invention consists in the arrangement, combination and construction of the various parts of my improved device as described in the specification, claimed in my claims and shown in the accompanying drawing, in which:

Figure 1:
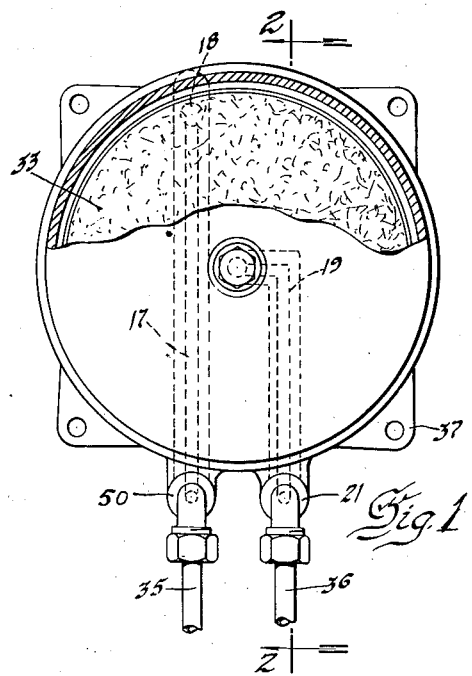
Fig. 1 is a front view of my improved device, shown partly in elevation and partly in section.
Figure 2:
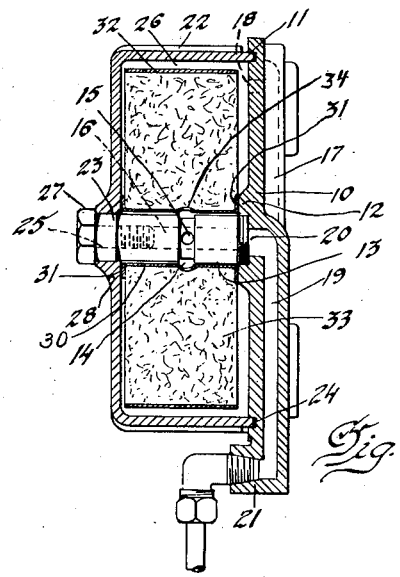
Fig. 2 is a sectional view of my improved device taken on lines 2—2 of Fig. 1.

I have shown a base 10 that has a groove 11 adjacent its edge and an apertured boss 12 in the center thereof. Threaded into the boss 12 is a member 13 that has a groove 14 intermediate its ends. Apertures 15 extend from the groove 14 to a passage 16 in the member 13.

Integral with the base is an intake passage 17 that has an outlet opening 18 near the groove 11 in the upper part of the base 10 and a flanged intake opening 50 projecting from the lower edge of the base. I also cast in the base 10 an off take passage 19. This passage 19 has an opening 20 in communication with the passage 16 of the member 13 and an outlet 21 corresponding to inlet 50 projecting from the base.

A cylindrical housing 22 having an aperture 23 adapted to fit around the free end of the member 13 has its edge inserted into the groove 11 bearing on the washer 24, and is removably secured to the base 10 by a bolt 25 threaded into the free end of the passage 16. The bolt head 27 bears against a boss 28 around the aperture 23. The housing 22 with the base 10 form a chamber 26, in which is placed a filtering unit.

In the construction of this unit I provide a collar 30 having flanged ends 31, a casing 32 and a filtering element 33 of cotton, paper or other suitable material compressed between the collar 30 and the casing 32. The collar 30 is adapted to be placed around the member 13 so that one of said flanged ends 31 will bear against the boss 12 and the other will be flush with the under surface of the housing 22. Apertures 34 are placed in the collar 30 is direct alignment with groove 14.

A feed line 35 is connected with the intake opening 50 for conveying fluids to be filtered and a conduit 36 is connected with the outlet 21 of the passage 19 to return the fluids from the filtering device to the source of use.

The base plate 10 has formed therewith the offset brackets 37 that are used to secure the entire device to a suitable object.

In the practical operation of my improved device, oil is forced under pressure from the feed line 35 through the inlet 50 into the passage 17 in the base and out the opening 18 into the chamber 26. The oil is then filtered through the element 33 to the apertures 34 in the collar 30, then passes around the groove 14 through the apertures 15 to the passage 16 into the outlet passage 19. The filtered oil is then returned to the source of use by the conduit 36.

It will be noted that in my improved device the oil entering the chamber has to pass through at least a portion of the filtering element before the same enters the offtake passage.

When the filtering element becomes old and inefficient it is an easy matter to replace the same with a new element by unscrewing the bolt 25, lifting off the cover 22 and then removing the entire filtering unit from the conduit 13. The filtering e'ement is then punched out of the case and a new element compressed therein. The new unit is then placed in the housing and the entirety reassembled.

It will be obvious that various changes may be made in the arrangement, combination and construction of the various parts of my improved device without departing from the spirit of my invention and it is my intention to cover by my claims such changes as may be reasonably included within the scope thereof.

What I claim is:

1. A device of the class described comprising a base plate having a boss in the center and provided with a passage extending therethrough, a member having a groove with apertures therein threaded into said boss, said member being provided with a passage in direct communication with said first passage, a filtering unit having apertures in alignment with said groove positioned around said member, a housing removably secured to said base forming a chamber around said filtering unit and a second passage integral with said base for conveying fluids to said chamber.

2. A device of the class described comprising a base plate provided with an annular groove adjacent its edge, a boss in the center of said base plate provided with an outlet passage, a member screwthreaded into said boss having an axial opening communicating with the outlet passage in said base plate and having a groove with apertures therein communicating with the axial opening in said member, a cylindrical housing having its edge received in the groove of said base plate, a bolt screwthreaded into the axial opening of said member for removably securing said housing to said base plate thereby forming a chamber having an intake passage for conveying fluids to said chamber, a collar having its opposite ends pinched between said base and said cylindrical housing positioned around said member and provided with apertures thru its wall, a casing in said chamber, and a filter element compressed between said casing and said collar covering the aperture in said collar.

3. A device of the class described comprising a base provided with intake and outlet passages opening thru the inner surface thereof, a housing adapted to cooperate with said base to form a chamber therewith, an apertured member secured to said base communicating with one of said passages, a collar around said member having its opposite ends engaging the inner walls of said housing and said base and provided with apertures to form a communication between said chamber and said apertured member, a filtering member carried by said collar covering the apertures in said collar, and means for detachably securing said housing on said member to form a seal between the opposits ends of said collar and said inner surfaces and between said base and housing.

4. A device of the class described comprising a base, an apertured member secured to said base projecting at right angles therefrom and in communication with an outlet passage, a cylindrical collar provided with openings in the wall thereof surrounding said apertured member, a filtering member carried by said collar covering the outer periphery thereof, a housing adapted to cooperate with said base to form a chamber therewith, said chamber being provided with an inlet passage, and means carried by said apertured member for detachably securing said housing in sealing relation against said base and pinching the opposite ends of said collar between the inner surfaces of said housing and said base.

JAMES C. ZEDER.